(12) United States Patent
Barber

(10) Patent No.: US 10,425,379 B2
(45) Date of Patent: *Sep. 24, 2019

(54) ESTABLISHING UNIQUE SESSIONS FOR DNS SUBSCRIBERS

(71) Applicant: Kount Inc., Boise, ID (US)

(72) Inventor: Timothy P. Barber, Boise, ID (US)

(73) Assignee: Kount Inc., Boise, ID (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/633,387

(22) Filed: Jun. 26, 2017

(65) Prior Publication Data

US 2017/0295133 A1    Oct. 12, 2017

Related U.S. Application Data

(63) Continuation of application No. 14/276,689, filed on May 13, 2014, now Pat. No. 9,722,968, which is a
(Continued)

(51) Int. Cl.
*G06F 15/16*    (2006.01)
*H04L 29/12*    (2006.01)
(Continued)

(52) U.S. Cl.
CPC .... *H04L 61/1511* (2013.01); *H04L 29/12066* (2013.01); *H04L 29/12801* (2013.01);
(Continued)

(58) Field of Classification Search
CPC ........... H04L 61/1511; H04L 29/12066; H04L 29/12801; H04L 61/2007; H04L 61/6004;
(Continued)

(56) References Cited

U.S. PATENT DOCUMENTS 6,092,178 A    7/2000  Jindal et al.
6,108,701 A    8/2000  Davies et al.
(Continued)

OTHER PUBLICATIONS

United States Office Action, U.S. Appl. No. 12/228,203, dated Jan. 7, 2011, seven pages.
(Continued)

*Primary Examiner* — Moustafa M Meky
(74) *Attorney, Agent, or Firm* — Fenwick & West LLP

(57) ABSTRACT

A system establishes virtual DNS servers that are supported by a DNS server. Target IP addresses are assigned for the virtual DNS servers. Network capable devices are uniquely assigned to the virtual DNS servers for domain name resolution. Each network capable device accesses the communication network through a corresponding network device associated with a corresponding source IP address. A client's service plan is assigned to a first network capable device used by the client. The service plan is implemented through a DNS request under a session established between the first network capable device and its assigned first virtual DNS server. The session is uniquely identified by a first source IP address of a first network device used by the first network capable device to access the communication network and a first target IP address of the first virtual DNS server.

20 Claims, 6 Drawing Sheets

Related U.S. Application Data continuation of application No. 13/745,125, filed on Jan. 18, 2013, now Pat. No. 8,762,574, which is a continuation of application No. 13/401,852, filed on Feb. 22, 2012, now Pat. No. 8,380,831, which is a continuation of application No. 13/096,673, filed on Apr. 28, 2011, now Pat. No. 8,140,689, which is a continuation of application No. 12/228,203, filed on Aug. 11, 2008, now Pat. No. 7,958,246.

(60) Provisional application No. 60/964,373, filed on Aug. 9, 2007.

(51) Int. Cl.
*H04L 29/06* (2006.01)
*H04L 29/08* (2006.01)

(52) U.S. Cl.
CPC ...... *H04L 61/2007* (2013.01); *H04L 61/6004* (2013.01); *H04L 63/102* (2013.01); *H04L 67/1036* (2013.01); *H04L 67/14* (2013.01); *H04L 67/146* (2013.01); *G06F 2221/2129* (2013.01); *H04L 67/1002* (2013.01); *H04L 67/1027* (2013.01)

(58) Field of Classification Search
CPC ... H04L 63/102; H04L 67/1036; H04L 67/14; H04L 67/146
See application file for complete search history.

(56) References Cited

U.S. PATENT DOCUMENTS

| | | | |
|---|---|---|---|
| 6,425,003 B1* | 7/2002 | Herzog | G06F 9/44589 709/203 |
| 6,449,647 B1 | 9/2002 | Colby et al. | |
| 6,862,624 B2 | 3/2005 | Colby et al. | |
| 6,895,429 B2 | 5/2005 | Banga et al. | |
| 7,047,301 B2 | 5/2006 | Skene et al. | |
| 7,194,553 B2 | 3/2007 | Lucco et al. | |
| 7,225,272 B2 | 5/2007 | Kelley et al. | |
| 7,283,534 B1 | 10/2007 | Kelly et al. | |
| 7,565,450 B2* | 7/2009 | Garcia-Luna-Aceves | G06F 12/1483 709/217 |
| 7,609,701 B2 | 10/2009 | Yang et al. | |
| 7,653,747 B2 | 1/2010 | Lucco et al. | |
| 7,725,602 B2 | 5/2010 | Liu et al. | |
| 7,840,699 B2 | 11/2010 | Fujita et al. | |
| 7,958,246 B2 | 6/2011 | Barber | |
| 7,984,192 B2 | 7/2011 | Burr et al. | |
| 7,990,847 B1 | 8/2011 | Leroy et al. | |
| 8,117,296 B2 | 2/2012 | Liu et al. | |
| 8,224,986 B1* | 7/2012 | Liskov | H04L 67/2814 709/238 |
| 8,332,522 B2 | 12/2012 | Barber | |
| 8,380,831 B2* | 2/2013 | Barber | H04L 29/12066 709/222 |
| 2001/0049741 A1 | 12/2001 | Skene et al. | |
| 2001/0052016 A1 | 12/2001 | Skene et al. | |
| 2003/0069974 A1 | 4/2003 | Lu et al. | |
| 2007/0008974 A1 | 1/2007 | Dispensa et al. | |

OTHER PUBLICATIONS

United States Office Action, U.S. Appl. No. 13/096,673, dated Jun. 30, 2011, seven pages.
United States Office Action, U.S. Appl. No. 13/401,851, dated May 7, 2012, six pages.
United States Office Action, U.S. Appl. No. 13/401,852, dated May 8, 2012, six pages.
United States Office Action, U.S. Appl. No. 13/745,125, dated Sep. 11, 2013, six pages.
United States Office Action, U.S. Appl. No. 14/276,689, dated Sep. 8, 2016, five pages.

* cited by examiner

ESTABLISHING UNIQUE SESSIONS FOR DNS SUBSCRIBERS

CROSS REFERENCE TO RELATED APPLICATIONS

This application is a continuation of U.S. application Ser. No. 14/276,689, filed on May 13, 2014, which is a continuation of U.S. application Ser. No. 13/745,125, now U.S. Pat. No. 8,762,574, filed Jan. 18, 2013, which is a continuation of U.S. application Ser. No. 13/401,852, now U.S. Pat. No. 8,380,831, filed Feb. 22, 2012, which is a continuation of U.S. application Ser. No. 13/096,673, now U.S. Pat. No. 8,140,689, filed Apr. 28, 2011, which is a continuation of U.S. application Ser. No. 12/228,203, now U.S. Pat. No. 7,958,246, filed Aug. 11, 2008, which claims the benefit of U.S. Provisional Application No. 60/964,373, filed Aug. 9, 2007, each of which is incorporated by reference in its entirety. This application is also related to U.S. application Ser. No. 13/401,851, now U.S. Pat. No. 8,332,522, filed Feb. 22, 2012, which is incorporated by reference in its entirety.

BACKGROUND

The present invention pertains to the field of computer networks, and in particular to the use of DNS (Domain Name System) services. Specifically, the present invention provides for the implementation of a service or service plan for a client through a DNS request that is supported by a unique session between a network capable device associated with the client and the DNS server that is servicing the DNS request.

The internet creates new ways to transfer information between users throughout the world. In general, the internet is a global system of interconnected networks that are able to communicate with each other. Each user is part of one of the networks that combined form the internet. As such, a user can access the internet through a corresponding network to visit other users and sites on the internet. Ever evolving services as implemented through the internet provide for the communication of information for business, education, work, private, and social purposes. As a result, these services attract increasing numbers of users to the internet year after year.

One of the many services provided by the internet is the capability of a user to connect to other computers and other resources to facilitate the back and forth transfer of data and information. Web sites on the internet provide access to varying types of information, such as personal, business, informational, etc. For instance, web sites on the internet may be maintained for social purposes. As an example, a personal web site provides insight to an individual by including images, audio samples, blogs, textual updates to the life of that individual, personal reflections, as well as many other pieces of information. In addition, web sites on the internet may be maintained for business purposes. As an example, a web site may be managed purely as a business operation (e.g., online retail stores) to facilitate the purchase of goods and services. In other cases, a web site may be run by a business to provide operation information and to further business relationships with its customers. In still other instances, a web site may be managed more as a portal for providing information (e.g., news and encyclopedic sites). These previous examples provide a brief glimpse to the varying amounts and types of information available on the internet.

However, not all web sites are desired by all individuals. That is, certain web sites may be suitable for one segment of the population, but may not be suitable for another segment of the population. For instance, a gambling web site that promotes and provides for online gambling services may be suitable for adults, but would be unsuitable for children. In addition, individuals may develop a preference for certain web sites, as well as an avoidance of other web sites. For instance, an individual may want to avoid certain political websites because they may provide inflammatory information.

A filtering system designed for a particular individual would allow for restricted access to the internet. That is, the filtering system would prevent an individual from accessing particular web sites. For instance, the filtering system could be designed to restrict access to a casino web site for a particular child.

However, one of the immediate problems exposed when implementing a third-party filtering system over the internet is the inability to identify which computer is accessing the internet. For example, a single family home may be associated with multiple computers. In a common scenario, the parents and children use different computers to access the internet. As a practical matter, for simultaneous access, both computers can access the internet using one connection. For instance, both computers can use a single router that provides simultaneous access to the internet. The router connects all the computers in the home with each other, and also provides a single gateway to the internet to support simultaneous connection to the internet by all the computers in the house. The router typically sits between the computers and the modem used for communicating over the network used to access the internet.

As such, for all the computers in the home, a single internet protocol (IP) address of the router is presented to the internet. To the external world, all requests for web sites and their information made from either the parent's computer or the children's computer seem to originate from a single IP address associated with the router. None of these requested web sites are immediately aware of the original computer behind the router making the request for information. While the router is able to assign internal IP addresses to each of the computers in the home, none of these internal IP addresses are readily available to the external world of the internet. These internal IP addresses are necessary to route the information obtained over the internet to the proper computer requesting that information.

The anonymity of computers can be problematic in relation to the users accessing the internet from the home. For instance, the parents may decide that it is appropriate for themselves to visit casino web sites for gambling purposes. However, the parents do not want their children to access those same casino web sites, and would like a filtering system to limit their children's access to the casino web sites. Moreover, a third-party filtering service would have a difficult time implementing a filter to restrict the children from viewing those casino web sites, mainly because of the inability to identify which computer is making requests to visit the casino web sites. Specifically, the third-party filtering service has a difficult time seeing beyond the IP address of the router serving the children's computer and the parent's computer. As such, the children's computer would not be restricted from visiting the casino web sites.

SUMMARY

A method for providing service over a communication network is described. The method includes establishing a plurality of virtual DNS servers that is supported by a DNS server providing domain name resolution to DNS subscribers. A plurality of target IP addresses is assigned for the plurality of virtual DNS servers. Each target IP address includes a first IP subaddress identifying the DNS server, and a second IP subaddress identifying a corresponding virtual DNS server. A plurality of network capable devices is uniquely assigned to the plurality of virtual DNS servers for domain name resolution. Each network capable device accesses the communication network through a corresponding network device (e.g., router) that is associated with a corresponding source IP address. A service plan of a client is assigned to a first network capable device used by the client. The service plan is implemented through a request for domain name resolution (DNS request) under a session established between the first network capable device and its assigned first virtual DNS server. The session is uniquely identified by a combination of a first source IP address of a first network device used by the first network capable device to access the communication network, and a first target IP address of the first virtual DNS server.

In addition, a system for providing service over a communication network is described. The system includes a DNS server for providing service to a plurality of clients, which are DNS subscribers. A plurality of virtual DNS servers is supported by the DNS server. The plurality of virtual DNS servers is assigned a plurality of target IP addresses. Each target IP address includes a first IP subaddress identifying the DNS server, and a second IP subaddress identifying a corresponding virtual DNS server. The system includes a header processor that supports the DNS server. The header processor determines a source IP address that is associated with a network capable device providing a DNS request. In particular, the source IP address corresponds to the IP address of the network device used by the network capable device to access the communication network. The header processor also determines a target IP address that is associated with a virtual DNS server to which the DNS request is directed. The system also includes a session verifier that supports the DNS server. The session verifier verifies that a unique session is established between the network capable device and the virtual DNS server. The unique session is uniquely identified by the combination of the source IP address of the network device, used to access the communication network, and the target IP address. In addition, the system includes a service provider that supports the DNS server. The service provider determines a service plan of a client using the network capable device to access a communication network. The service plan/client association is based on the unique combination of the source IP address and the target address.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION

Figure 1A:
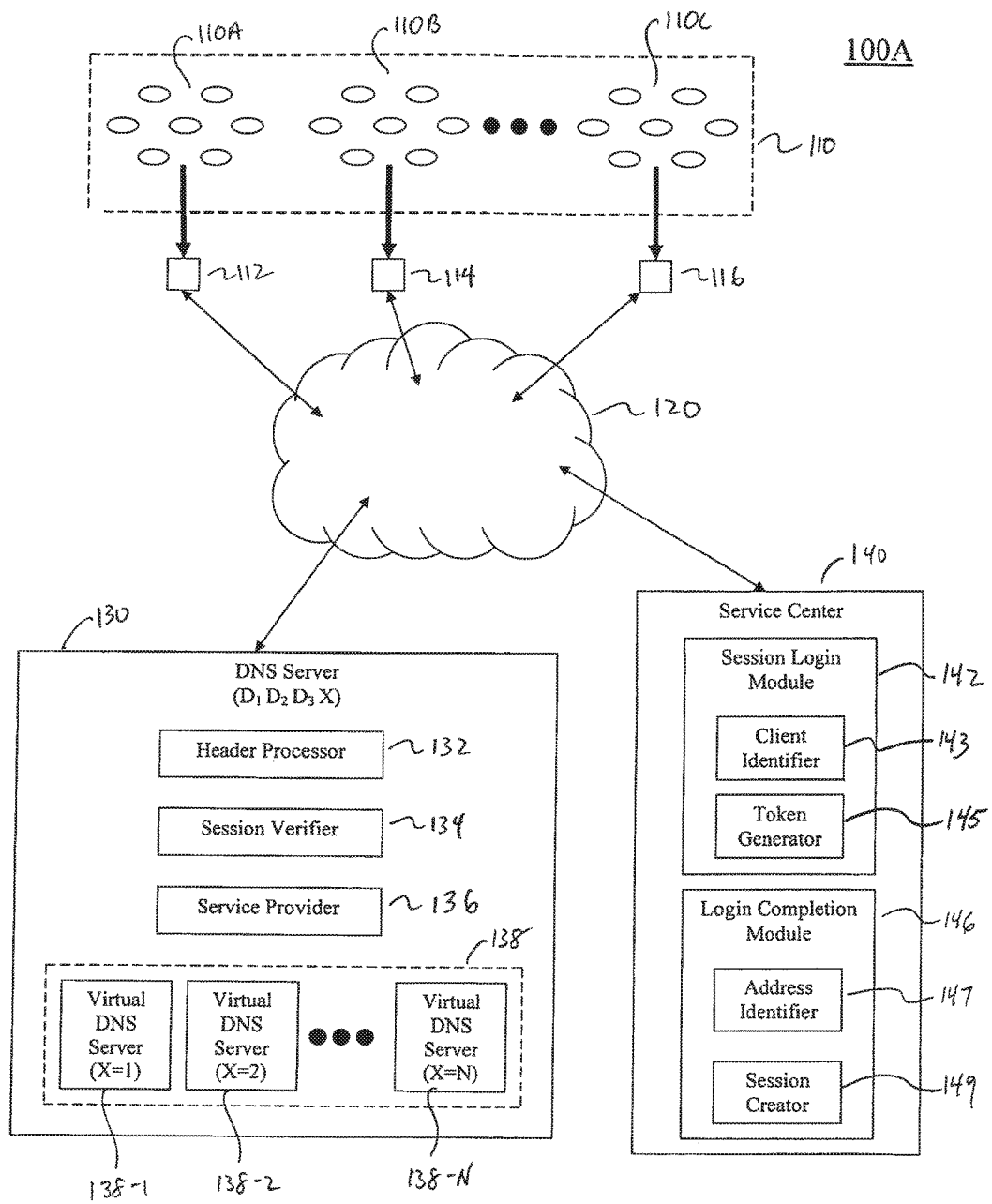
FIG. 1A is a diagram of a communication network that includes a system that is capable of providing service to DNS subscribers, in accordance with one embodiment of the present invention.

Reference will now be made in detail to the preferred embodiments of the present invention, a method and system for establishing unique sessions for DNS subscribers. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Accordingly, embodiments of the present invention are capable of providing a service for a client through a unique session established between a network capable device, used by the client to access a communication network, and a virtual DNS server to which the network capable device directs its DNS requests. The unique session provides the ability to distinguish between multiple computers which access the communication network through a single network device (e.g., router).

Notation and Nomenclature

Embodiments of the present invention can be implemented on a software program for processing data through a computer system. The computer system can be a personal computer, notebook computer, server computer, mainframe, networked computer (e.g., router), handheld computer, personal digital assistant, workstation, and the like. This program or its corresponding hardware implementation is operable for establishing unique sessions for DNS subscribers, and for providing service to clients according to the unique sessions. In one embodiment, the computer system includes a processor coupled to a bus and memory storage coupled to the bus. The memory storage can be volatile or non-volatile and can include removable storage media. The computer can also include a display, provision for data input and output, etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "establishing," "assigning," "identifying," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

Domain Name Resolution

Embodiments of the present invention provide service plans to DNS subscribers through the establishment of unique sessions. More particularly, the present invention allows for implementation of a service plan upon the request of a web site on the internet, and more specifically, upon the request of a domain name of the web site. For instance, a client, through a web browser, can access content provided through a web server by requesting a uniform resource locator (URL). A sample URL is provided as follows: "http://www.websitename.com." The URL provides a human readable address within the internet for accessing a web server, and a file path within the web server that accesses the file providing the content.

While the URL is suitable for human users, computing resources need to translate the URL to an IP address made up of machine readable bits. At this stage, the web browser, or resolving engine associated with web browser, may issue a request for domain name resolution (DNS request) to discover the IP address of the domain name associated with the URL, wherein the domain name is "websitename.com." The DNS request is issued to one or more distributed DNS servers that support the resolving of domain names throughout the internet. If one DNS server is unable to support the resolving of the domain name, that DNS server is capable of providing the address of another DNS server that is closer to resolving the domain name. Eventually, one of the set of appropriate DNS servers is accessed and the proper IP address associated with the domain name is accessed and returned to the originator of the DNS request, such as the resolver associated with the web browser used by the client.

Once the IP address is obtained, a session can be established between the web browser and the web site ("websitename.com") for the transfer of content. For instance, the web browser is able to establish a communication session, using the hypertext transfer protocol (HTTP), with the web site server. HTTP is a communication protocol used for transferring information across the communication network that establishes a communication session between two computing resources.

The domain name resolution protocol receives and sends user datagram protocol (UDP) packets for purposes of domain name resolution, as previously described. UDP is a connectionless protocol that runs on top of the IP system of the Open Systems Interconnection (OSI) model of networking, and can be designated UDP/IP. In contrast to the transmission control protocol (TCP) for directing the transmission of data packets between computing resources over a network, UDP/IP provides few error recovery services, and does not guarantee delivery. Instead, UDP provides a lightweight, but sessionless connection between computing resources for the transfer of data packets. As such, UDP offers a fast and direct way to send and receive datagrams over an IP network. UDP is typically used for transmitting small amounts of data, or when there is a real-time requirement for the transfer of data. Some uses for UDP is used for example for broadcasting messages over a network to multiple destinations.

Typically, when resolving DNS requests using UDP, a DNS server is unable to distinguish two client machines that share an outbound IP address. For instance, two machines on a home or office local area network (LAN) are indistinguishable to the DNS server, since both machines use the IP address of a router to make DNS requests over a communication network (e.g., internet). In addition, a client's IP address may change suddenly over time. For these reasons, historically DNS services are generic, in that they have no user specified preferences, because DNS servers cannot distinguish between client machines that share an outbound IP address.

However, embodiments of the present invention are able to create unique sessions between a client machine used to access a communication network and a DNS server that is used to resolve DNS requests. That is, when resolving DNS requests, the DNS server is able to distinguish between client machines that share an outbound IP address and thereafter identify a client associated with the client machine making a DNS request. As such, a service plan associated with the client may be implemented.

Communication Network

FIG. 1A is an illustration of a communication system 100A that is capable of providing service plans to DNS subscribers through the establishment of unique sessions between client capable devices used to access the internet and their virtual DNS server used for domain name resolution. More particularly, the present invention allows for implementation of a service plan upon the request of a web site on the internet, and more specifically, upon the request of a domain name of the web site. For instance, the service plan may restrict access to a particular web site, or a type of web site for a corresponding client.

Embodiments of the present invention are described within the context of a web-based system (e.g., internet 120) for providing service plans to clients having established sessions with a DNS server 130. The internet 120 is a collection of communicatively coupled web servers and web browsers associated with a client's computing resource that allow for the transfer of content (e.g., advertisements, web pages, files, etc.) between web sites and various clients. While embodiments of the present invention are described within the context of the internet 120, other embodiments are well suited to providing service plans within any communication network (e.g., LANs).

As shown in FIG. 1A, a plurality of network capable devices 110 accesses the internet 120, each through a corresponding network device (e.g., router). That is, a network capable device is communicatively coupled to a corresponding network device to facilitate access to internet 120. It is understood that in some embodiments, a network capable device itself accesses the internet 120, and does not need the support of a router. For instance, a stand-alone computer by itself may access the internet as its own network device (e.g., through a network interface or card). More particularly, the plurality of network capable devices 110 is used by a plurality of clients for accessing the internet. In general, the plurality of network capable devices 110 includes any computing resource capable of supporting an application (e.g., browser) used to access the internet, such as a handheld computing resource (personal digital assistants, mobile phones, positioning locators) and a standalone computing resource (e.g., desktop, notebook computers, set-top boxes, smart appliances, and gaming consoles).

For instance, a first group of network capable devices 110A accesses the internet 120 through network device 112. The first group 110A is representative of a situation in which multiple network capable devices are similarly located (e.g., in a home or business office) and access the internet 120 through a single connection. For instance, the first group of network capable devices 110A accesses the internet 120 through router 112. The remaining groups of network capable devices are similarly configured. More specifically, the second group of network capable devices 110B accesses the internet 120 through network device 114. Also, the Nth group of network capable devices 110N accesses the internet 120 through network device 116.

As shown in FIG. 1A, the communication system 100A includes a DNS server 130 that is capable of providing service plans to a plurality of clients. As previously described, the plurality of clients uses the plurality of network capable devices 110 to access the internet 120. On the surface, DNS server 130 provides domain name resolution for the network capable devices. In addition, DNS server 130 implements service plans for clients that have established unique sessions with the DNS server 130 when servicing a DNS request for a web site, as will be described more fully below in relation to FIG. 2.

The DNS server 130 supports a plurality of virtual DNS servers 138. The plurality of network capable devices 110 is configured to connect with particular virtual DNS servers for domain name resolution. That is, each network capable device is configured to connect with a particular virtual DNS server for performing domain name resolution. However, in practice, the DNS server 130 provides the domain name resolution for each of the plurality of virtual DNS servers 138.

More particularly, the DNS server 130 supports multiple IP addresses corresponding to the plurality of virtual DNS servers. That is, the DNS server 130 is associated with a range of legitimate IP addresses. An IP address is a unique number on the internet 120. When the IP address is associated with a particular machine (e.g., in this case the virtual DNS server through DNS server 130) this allows for communication with that particular machine over the internet 120. The IP address is typically represented by 32 bits that can be further expressed as four "octets." Though expressed in binary form, for purposes of clarity, in translation each of the octets represents a number in the decimal system ranging from 0-255. That is, 256 values are available for each of the octets. For instance, in decimal form, a typical IP address example is expressed as follows: 250.188.056.100.

The plurality of virtual DNS servers is assigned a plurality of target IP addresses, each supported by DNS server 130. In one embodiment, the target IP address of each virtual DNS server is configured in two parts, or subaddresses. The first subaddress represents the address of the DNS server 130. The second subaddress represents the address of the particular virtual DNS server supported by the DNS server 130. No specific bit size is assigned to each of the first or second subaddresses. That is, embodiments of the present invention support varying sizes for the first and second subaddresses. However, in one embodiment, the first subaddress includes the first three octets of the IP address. That is, for purposes of locating the DNS server 130 on the internet 130, only the first three octets are necessary for identifying DNS server 130.

As such, the last octet in the IP address can be used for additional purposes, such as identifying a particular virtual DNS server. For instance, the IP address of the virtual DNS server is expressed as follows: D1. D2. D3. X. In this example, D1, D2, and D3 are nonvarying octet values. In addition, X is also an octet value, but can be any decimal number in the range of 0-255. That is, the value X represents a different virtual DNS server. As such, in the above example, up to 256 different IP addresses can be used to designate DNS server 130 for domain name resolution. That is, while the target IP address points to a specific virtual DNS server in the plurality of virtual DNS servers 138, DNS server 130 actually provides the domain name resolution. For instance, the IP address of virtual DNS server 138-1 (where X=1) is represented as follows, where X is expressed in decimal form: D1 D2. D3. 1. Also, the IP address of virtual DNS sever 138-2 (where X=2) is represented as follows, where X is expressed in domical form: D1 D2. D3. 2. Further, the IP address of virtual DNS server 138-N (where X=N) is represented as follows, where N represents a decimal number between 0-255: D1 D2. D3. N.

In addition, DNS server 130 includes a header processor 132 that supports the DNS server 130. Specifically, header processor 132 determines a source IP address that is associated with a network capable device providing a DNS request for purposes of implementing a service plan for a client using the network capable device for accessing the internet 120. More particularly, header processor 132 determines the source IP address of the network device (e.g., router) used by the network capable device to access the internet. For instance, the source IP address is included in the header of a DNS request sent to the virtual DNS server.

In addition, header processor 132 determines a target IP address that is associated with a virtual DNS server to which the DNS request is directed. The target IP address is also included in the header of the DNS request that is sent to the virtual DNS server.

DNS server 130 also includes a session verifier 134 that supports the DNS server 130 for purposes of implementing a service plan for the client. The session verifier 134 verifies that a unique session has been established between the network capable device, used by the client to access the internet, and the virtual DNS server to which a DNS request has been sent by the network capable device. More particularly, the session verifier 134 verifies that a unique session has been established between the network device used by the network capable device to provide the DNS request, and the virtual DNS server. The unique session is uniquely identified by a combination of the source IP address, of the network device used to provide the DNS request, and the target IP address of the virtual DNS server, to which the DNS request was sent.

In addition, DNS server 130 also includes a service provider 136 that supports the DNS server 130 for purposes of implementing a service plan for the client. Once the unique session is verified by the unique combination of the source IP address and the target IP address, the client is known. As such, DNS service provider 136 is able to identify a service plan associated with the client and implement the service plan. For instance, one service under the plan would be to filter the DNS requests and to restrict access to particular web sites, by not resolving their corresponding domain names.

As is shown in FIG. 1A, system 100A also includes a service center 140. One of the functions of the service center 140 is to maintain the service plans of each of its clients, or DNS subscribers. In addition, service center 140 facilitates the establishment of unique sessions for its clients for purposes of implementing service plans. More particularly, service center 140 includes a session login module 142 and a login completion module 146 that are communicatively coupled, and combined help establish unique sessions for its clients.

The session login module 142 includes a client identifier 143 for uniquely identifying a client requesting a session. The process for identifying a client is further described in relation to FIGS. 3, 4A and 4B. In addition, session login module 142 also includes a token generator 145 for generating a token that is associated with the client. A token is generated by the token generator 145 for purposes of discovering the source IP address that is associated with the network capable device used by the client for making DNS requests when accessing web sites on the internet. More particularly, the token is used to discover the source IP address of the network device used by the network capable device to access the internet when making a DNS request. The process for generating and using a token to discover the source IP address is further described in relation to FIGS. 3, 4A and 4B.

The login completion module 146 includes an address identifier 147 and a session creator 149. The address identifier 147 determines the source IP address that is associated with the network capable device. In particular, the source IP address is discovered during a DNS request for a domain name that includes the token. In addition, the address identifier 147 determines the target IP address of the virtual DNS server, to which the DNS request of the domain name including the token is directed for domain name resolution. In addition, login completion module includes a session creator 149. Once the client has been identified and associated with the source IP address and the target IP address through their affiliation with the token, session creator 149 is able to establish a unique session for the client. In particular, a unique session between the network capable device and the virtual DNS server is established by uniquely associating the network capable device with a combination of source IP address and the target IP address. More specifically, the unique session is established between the network device, that is used by the network capable device to make DNS requests, and the virtual DNS server using the combination of the source IP address and the target IP address.

Not shown in FIG. 1A, a typical implementation of the present invention would include more than one DNS server, each of which is capable of supporting a plurality of virtual DNS servers. This is common because UDP does not guarantee delivery of messages, and so a DNS request may be sent to different DNS servers. Each DNS server has a different IP address. For instance, each DNS server would have a different value in the first three octets of the IP address. As an example, an alternate DNS server would be D1'. D2'. D3'. In the present embodiment, each client computer would be configured to indicate a different DNS server through the use of the first subaddress. Each DNS server would have a unique first subaddress. However, the second subaddress (e.g., X of the last octet of the IP address) would be the same for a particular network capable device across all the different DNS servers.

Figure 1B:
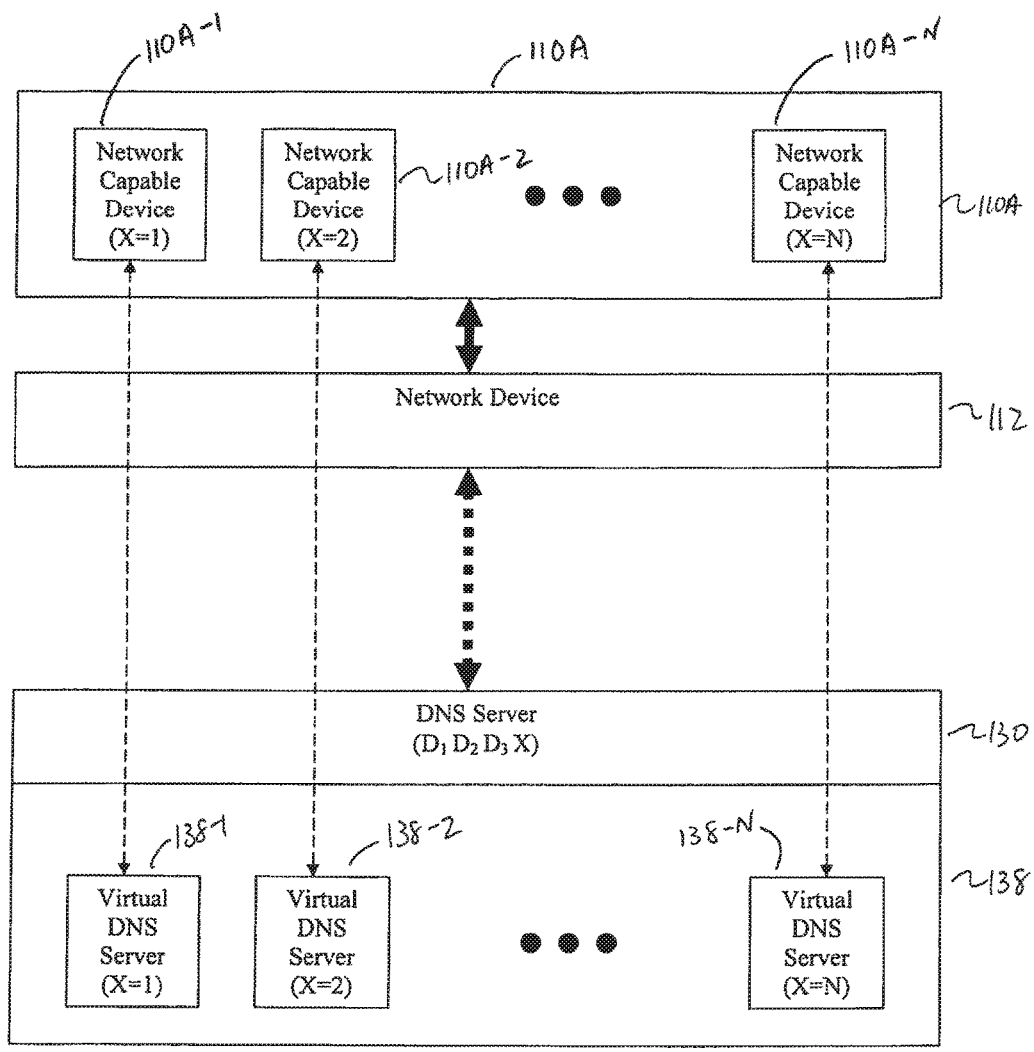
FIG. 1B is a diagram of the one-to-one relationships between a plurality of network capable devices, each associated with a client, and a plurality of virtual DNS servers supported by a DNS server, in accordance with one embodiment of the present invention.

FIG. 1B is a diagram 100B that illustrates the establishment of unique sessions for a group of network capable devices (e.g., group 110A of FIG. 1A) with DNS server 130, in accordance with one embodiment of the present invention. As described previously, each of the network capable devices in group 110A may be commonly located, such as in a home, or office. In addition, each of the network capable devices in group 110A accesses the internet 120 through network device 112 (e.g. router). More particularly, each of the network capable devices accesses the internet 120 through network device 112 for purposes of making DNS requests for domain name resolution.

While FIG. 1B shows a group consisting of multiple network capable devices, embodiments of the presenting invention are well suited to providing service to a DNS subscriber using a network capable device that is not associated with a group of multiple network capable devices. That is, the client as the DNS subscriber does not need to access the internet 120 using a network device, as it is the only device accessing the network over a single connection. For instance, a single computer with a network card can access the internet 120 and is fully supported by the present invention, such that services for the client can be implemented via DNS requests.

The group of network capable devices 110A includes network capable devices 110A-X, wherein X ranges from 1-N. As such, each of the network capable devices is given a value X. Also, the value X also corresponds to a particular virtual DNS server in the plurality of virtual DNS servers 138. As such, each network capable device has a one-to-one association with a particular virtual DNS server in DNS server 130.

More particularly, the one-to-one association is made for purposes of DNS resolution. All the network capable devices 110A-X are configured to use DNS server 130, that is effectively identified by the value "D1. D2. D3," as previously described. However, each network capable device 110A-X is specifically configured to direct its domain name resolution requests to a particular virtual DNS server 138-X. In this particular example, X ranges from 0-255, as an octet value in the IP address. As such, each virtual DNS server is effectively identified by the value "D1 D2. D3. X," as previously described.

For instance, network capable device 110A-1 is configured to direct its DNS requests to virtual DNS server 138-1, which has an IP address of D1 D2. D3. 1. In addition, network capable device 110A-2 is configured to direct its DNS requests to virtual DNS server 138-2, which has an IP address of D1. D2. D3. 2. Also, network capable device 110A-N is configured to direct its DNS requests to virtual DNS server 138-N, which has an IP address of D1 D2. D3. N.

Providing Service to DNS Subscribers

Figure 2:
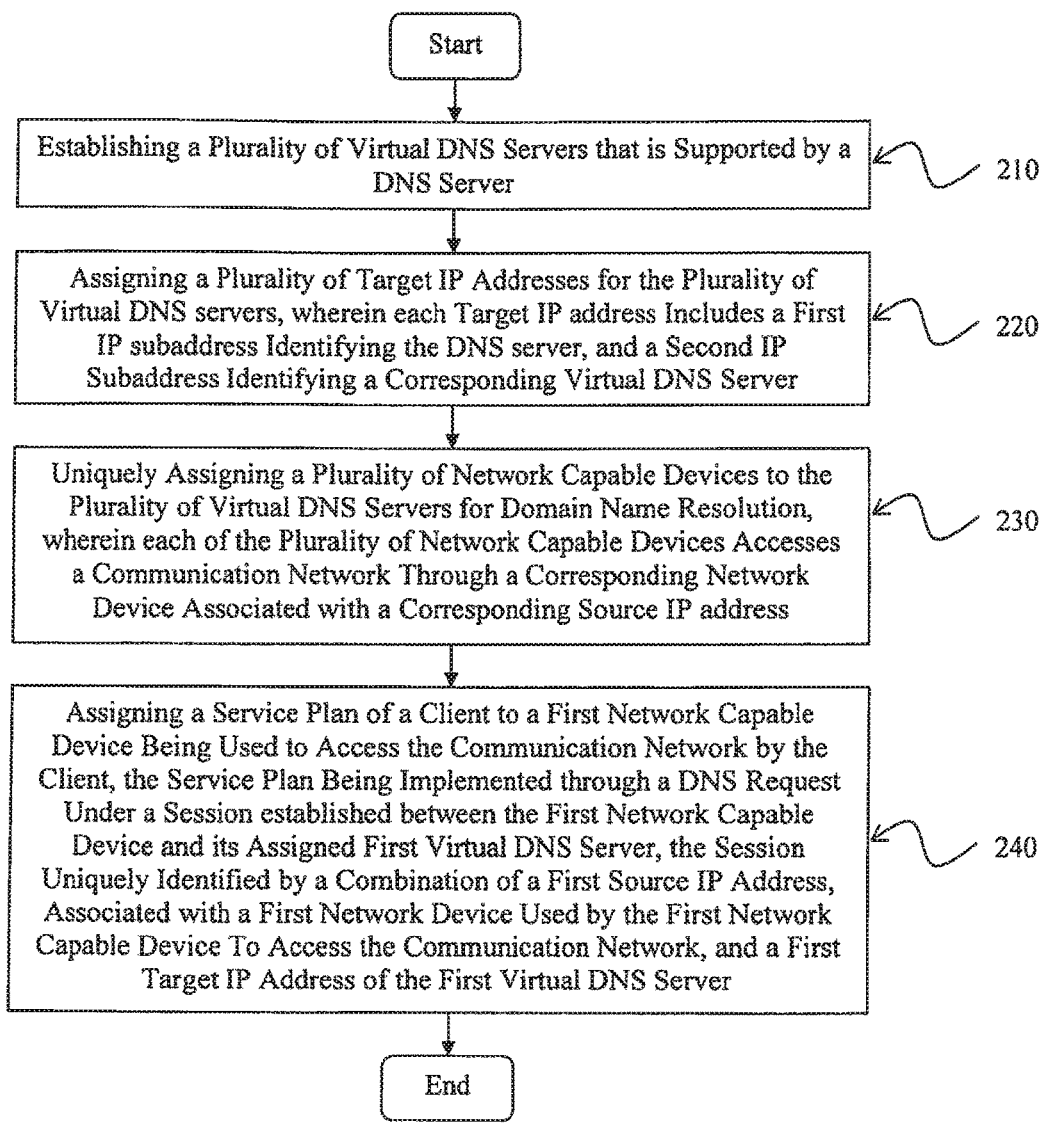
FIG. 2 is a flow diagram illustrating a method for providing service to DNS subscribers, in accordance with one embodiment of the present invention.

FIG. 2 is a flow diagram 200 illustrating a method for providing service through unique sessions to clients, who are DNS subscribers, in accordance with one embodiment of the present invention. Implementation of the process illustrated in the method outlined in FIG. 2 is provided through the communication system 100 of FIG. 1, in one embodiment.

At 210, a plurality of virtual DNS servers is established. Each of the virtual DNS servers provide domain name resolution for client machines configured to make DNS requests from a corresponding virtual DNS server. The virtual DNS servers are supported by a DNS server. That is, the DNS server provides domain name resolution on behalf of the virtual DNS servers.

At 220, a plurality of target IP addresses for the plurality of virtual DNS servers is assigned. As described previously, each target IP address includes a first subaddress and a second subaddress. The first subaddress (e.g., D1 D2. D3) is sufficient to identify the address of the DNS server. That is, the first subaddress allows other computing resources to identify the DNS server over the internet 120 for purposes of the transfer of data. The second subaddress (e.g., X) identifies the corresponding virtual DNS server. For instance, as previously expressed, the IP address of a virtual DNS server is expressed as D1 D2. D3. X, where D1 D2. D3 points to the DNS server which performs the domain name resolution, and where X, ranging from a value of 0-255 as an octet, points to the virtual DNS server behind the DNS server.

At 230, a plurality of network capable devices is uniquely assigned to the plurality of virtual DNS servers for domain name resolution. Each of the plurality of network capable devices accesses a communication network (e.g., internet) through a corresponding network device associated with a corresponding source IP address. For instance, in some cases, the network device is a router communicatively coupled to a group of network capable devices to provide access to the communication network. As an example, in the group of network capable devices (e.g., group 110A of FIG. 1A), each network capable device is uniquely assigned to one of the plurality of virtual DNS servers for domain name resolution service. In other cases, the network device could be a network card that facilitates access to the communication network for a single network capable device.

It is important to note that for purposes of service plan implementation, a group of network capable devices that is associated with a network device for purposes of access to a communication network may exceed the number of virtual DNS servers supported by the DNS server, in one embodiment. However, for simultaneous implementation of service plans, the DNS server can only support clients up to the number of virtual DNS servers. This is because a unique association is established between each network capable device and the DNS server, through the combination of the source IP address of the network device used for making DNS requests and the target IP address of the virtual server to which a DNS request is directed. The establishment of the unique association between the client, the client's network capable device, the network device through which DNS requests are made, and the virtual DNS server is described more fully below in relation to FIGS. 3, 4A, and 4B.

At 240, a service plan of a client is assigned to the network capable device that is being used to access the communication network. A service plan typically contains one or more user specified preferences, or services. Some service plans may contain no user preferences. The network capable device is being used by the client to access web sites on the communication network, and correspondingly to make DNS requests to obtain the IP addresses of the web sites. The service plan is implemented through a DNS request. More specifically, the DNS request is made under a unique session that is established between the network capable device and its assigned virtual DNS server that performs domain name resolution. That is, the unique session is established between the network device (e.g., router or network card) used by the network capable device to make DNS requests. The session is uniquely identified by the combination of the source IP address of the network device and a target IP address of the virtual DNS server performing domain name resolution.

In addition, a plurality of service plans for a plurality of clients is assigned to a plurality of network capable devices, each of which is used to access the communication network. Each service plan of a client is uniquely identified by a corresponding combination of source IP address and target IP address that is related to an associated network device used to make a corresponding DNS request to a particularly virtual DNS server.

For instance, a particular group of network capable devices accesses the communication network through a single network device (e.g. router). The network capable devices are uniquely assigned to a corresponding virtual DNS sever supported by a DNS server, for domain name resolution. Also, each service plan of a corresponding client is uniquely identified through a combination of the source IP address of the network device and the corresponding target IP address of the corresponding virtual DNS server to which a DNS request is directed. The DNS request is made under a unique session between the network device and the virtual DNS server.

Figure 3:
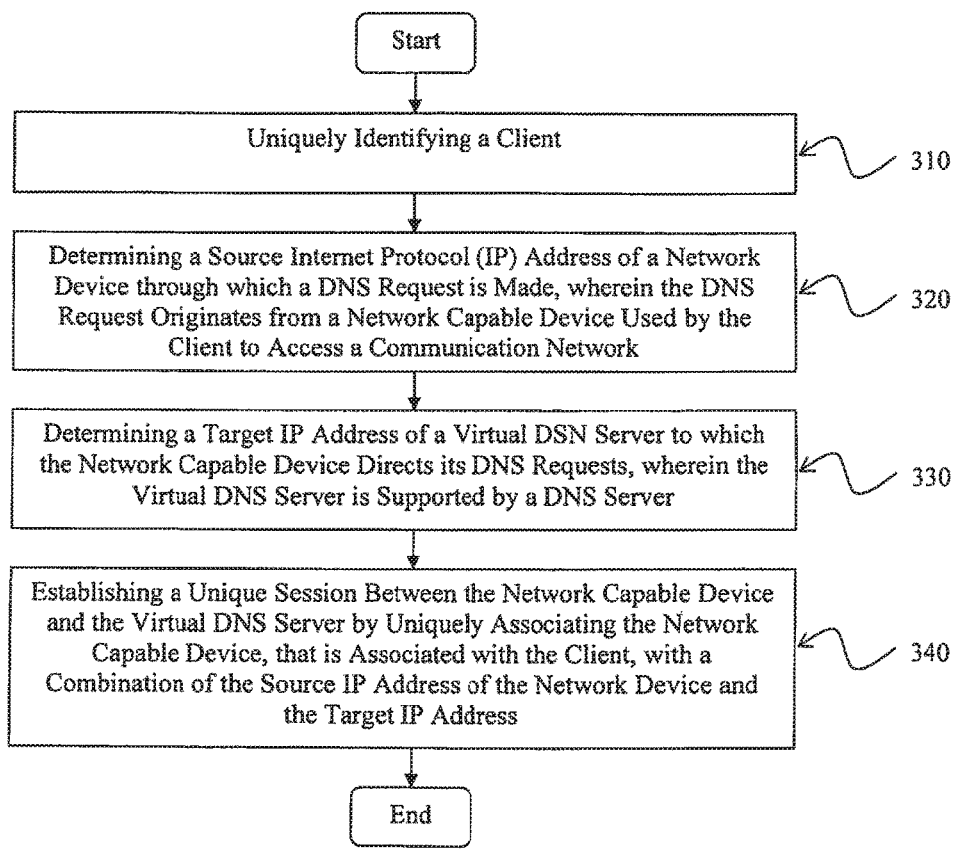
FIG. 3 is a flow diagram illustrating a method for establishing a unique session between a network capable device and a virtual DNS server, in accordance with one embodiment of the present invention.

FIG. 3 is a flow diagram 300 illustrating a method for providing service through unique sessions to clients, who are DNS subscribers, in accordance with one embodiment of the present invention. More particularly, flow diagram 300 illustrates a method for establishing a unique session for a client. Once the session is established, a service plan associated with the client can be implemented through a DNS request.

At 310, a client is identified. More particularly, it is necessary to identify a client that is requesting a session to be established. For instance, the session is established through the service center 140 of FIG. 1A. Once the client is identified, a service plan associated with the client is also known. In addition, a service plan for the client can be implemented in a session, between the network device used to make DNS requests and the virtual DNS server, that is established for the client.

At 320, a source IP address is determined. The source IP address is for the network device through which a DNS request is made. More particularly, the determination of the source IP address is made through a DNS request that originates from a network capable device used by the client to access the communication network. The network capable device uses the network device to access the communication network, and for making DNS requests. It is important to determine a source IP address that is constant during a particular session. As such, by ensuring that a DNS request, originating from the network capable device, is used for establishing a session, subsequent DNS requests that also originate from the network capable device will also go through a network device having the same source IP address.

At 330, a target IP address is determined. The target IP address corresponds to a virtual DNS server to which the DNS request is directed. As previously described, the virtual DNS server is supported by a DNS server. In addition, the network capable device is configured to direct all of its DNS requests to the virtual DNS server. For instance, the resolving engine associated with the network capable device resolves a requested domain name of a web site. It may have the IP address, stored in cache, due to an earlier request for the web site, or it may have to make a DNS request directed to a corresponding virtual DNS server.

At 340, a unique session is established between the network capable device and the virtual DNS server. In particular, a unique association is made between the network capable device that is associated with the client and the virtual DNS server. This association is made through a combination of the source IP address of the network device, used by the network capable device for accessing a communication network and for making DNS requests, and a target IP address of the virtual DNS server to which the DNS request is directed. As such, once an association is made between a client, the client's network capable device, a network device used for accessing the internet and through which DNS requests are made, and a virtual DNS server, a service plan of the client can be implemented when performing DNS requests, that are not specifically used to establish a session.

Figure 4A:
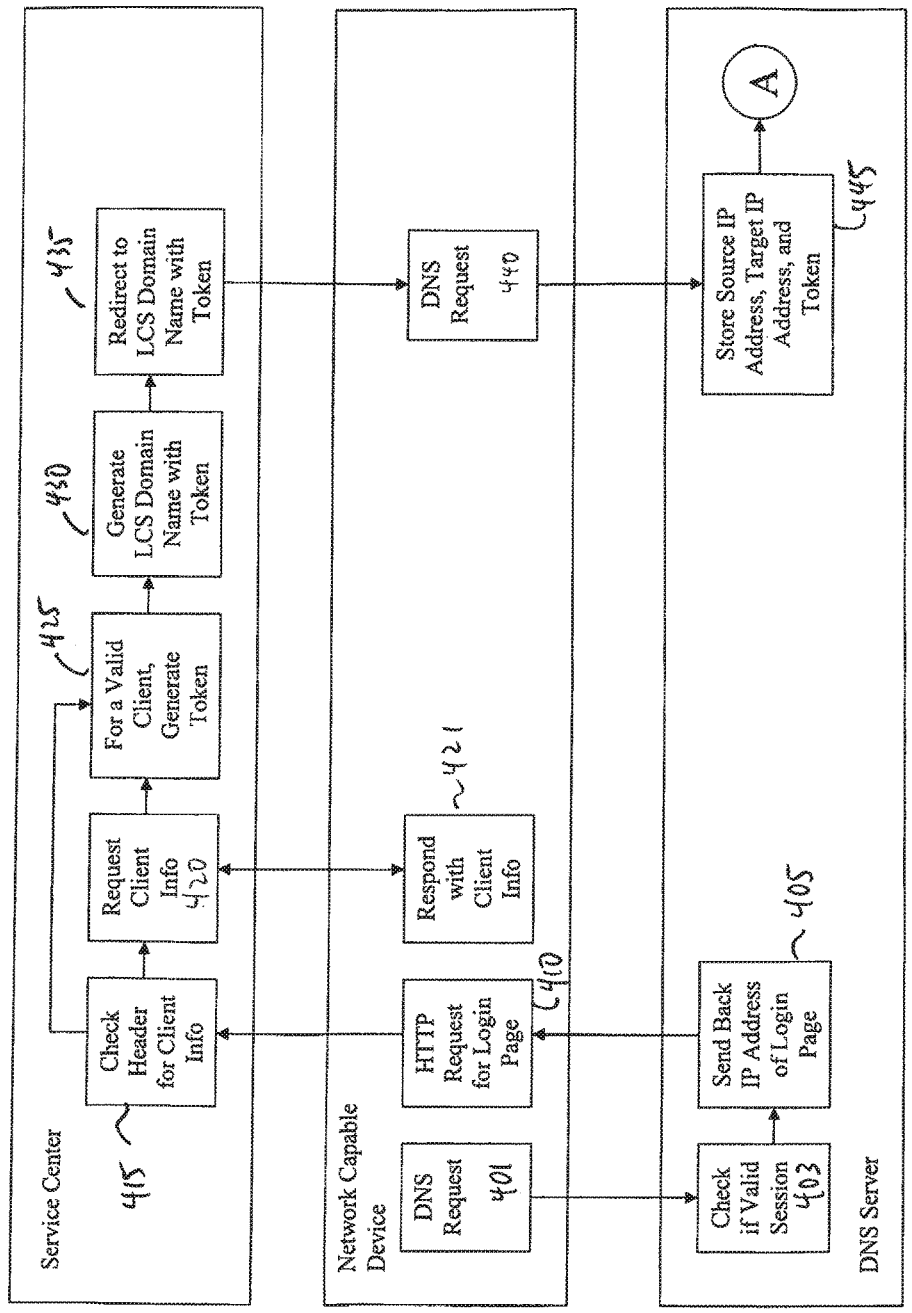
FIGS. 4A and 4B combined is a data flow diagram illustrating the flow of information exhibited in a method for establishing a unique session of FIG. 3, in accordance with one embodiment of the present invention.
Figure 4B:
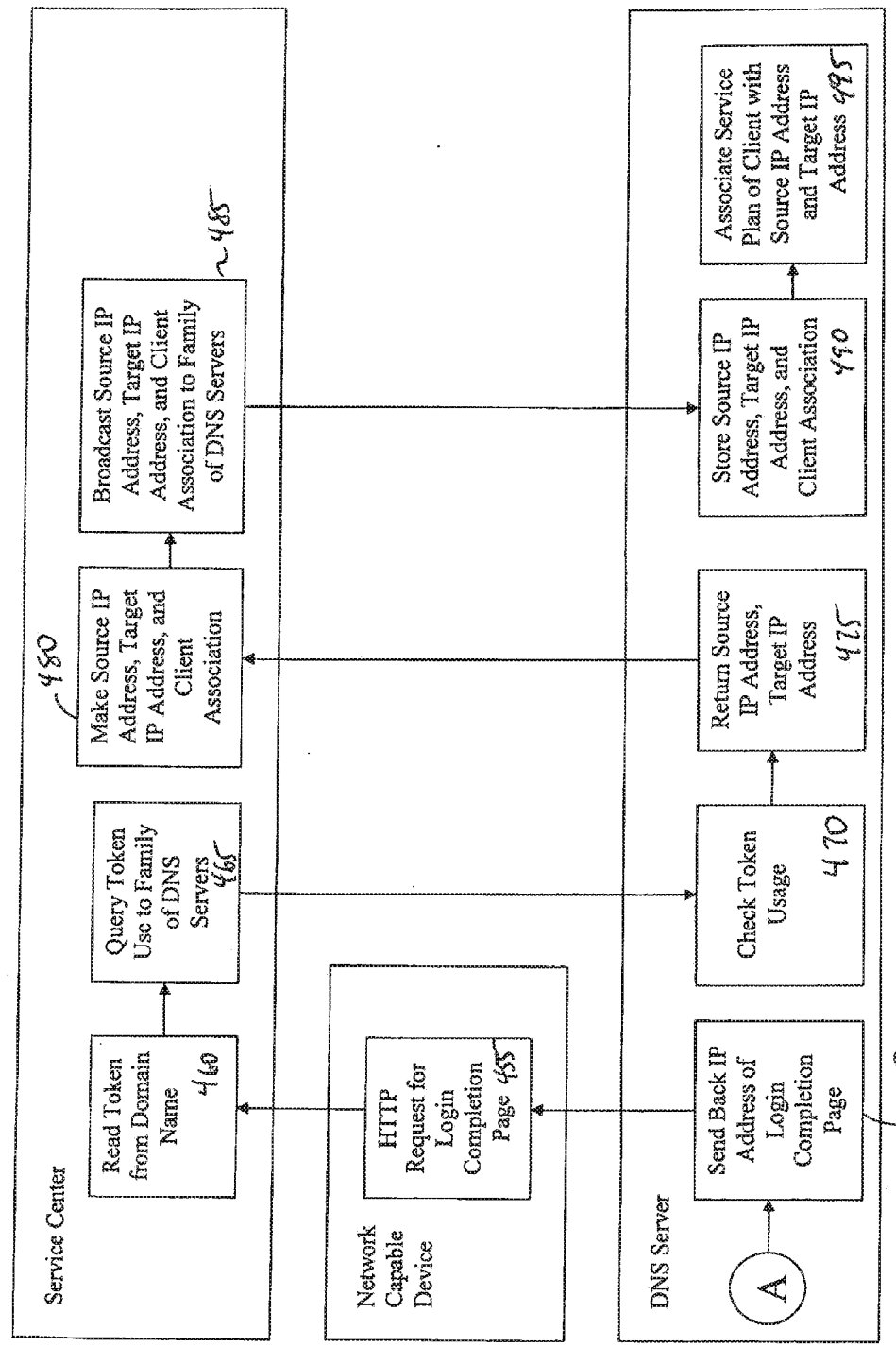

FIGS. 4A and 4B are data-flow diagrams that outline the flow of information in a method for establishing unique sessions for purposes of providing a service to DNS subscribers, first described in FIG. 3, in accordance with one embodiment of the present invention. The flow of data shown in FIGS. 4A and 4B is conducted between three devices, 1) various components of the network capable device (e.g., browser and domain name resolving engine), 2) the DNS server (e.g., server 130 of FIG. 1A) that supports a plurality of virtual DNS servers, and 3) the service center (e.g., center 140 of FIG. 1A). During the process, a unique session is established that is associated, in part, with a client, the client's network capable device, and the virtual DNS server that provides domain name resolution for the network capable device.

For purposes of illustration purposes only, a client uses a network capable device to access a communication network (e.g., internet). The network capable device is configured to a use a DNS service for resolving domain names. In particular, the network capable device is configured to use a virtual DNS service that is supported by the DNS service for resolving domain names. Also, the network capable device is associated with a network device that facilitates communication over the communication network. The network device may be a router or network card, etc.

At block 401, a DNS request is made by the network capable device. For instance, a client opens a web browser for accessing web sites on the communication network. A request for access to a web site on the internet is made, such as one made by clicking on a link for a web site. As such, a DNS request, originating in the network capable device, is made to resolve the domain name of the requested web site to an IP address.

In one embodiment, a gray list is introduced for purposes of triggering a service plan for a client. In one case, the service is directed to limiting access to particular web sites, as indicated in a service plan. Other types of services are equally implementable, in other embodiments. For instance, a request for "amazon.co" may be associated with a client preference to map to "amazon.com" for one client, but to map to "Columbia" for another client.

As such, the DNS server will use a gray list of web sites to trigger the implementation of the service plan for a client. When a DNS server is resolving the DNS request, the DNS server will check to see if the domain name is listed on the gray list. If the web site is not on the gray list, then the DNS server will resolve the domain name, as normal, to an IP address and return the IP address to the client's network capable device. On the other hand, if the web site is on the gray list, then implementation by the DNS server of a corresponding service plan is triggered. That is, the DNS server will determine which client preferences are listed in the corresponding service plan (e.g., possible blocking of the requested web site).

In another embodiment, the gray list may categorize web sites for blocking. In particular, categories are set up to facilitate blocking of web sites. For example, the gray list may be provided as a table of records. Each record indicates a website URL, and a category that is indicated by the client.

As such, when a particular category is triggered, a check of web sites is made to determine if the requested web site is listed on the gray list in that category.

Returning back to FIG. 4A, at block 403, after the DNS request is sent to the DNS server, and it is determined that the requested web site is on the gray list, the DNS server determines if there is a session existing in association with the network capable device making the DNS request. That is, it is determined whether there is a valid session to which a service plan can be implemented. As such, for a valid session, the source IP address of the network device used to send the DNS request, and the target IP address of the virtual DNS server to which the DNS request is sent, create a unique combination that is associated with a client, and the client's service plan. As such, under a valid session, the service plan can be implemented in conjunction with resolving the DNS request.

On the other hand, if a valid session does not exist, then the DNS server replies to the DNS request with the IP address of the DNS service login page. For instance, the login page is managed by the session login module 142 of the service center 140 of FIG. 1A. As such, the IP address is sent back to the network capable device, and at block 410, the network capable device issues an HTTP request for the login page that is managed by the session login module 142.

More particularly, the HTTP request that is sent to the service center contains a header. The header may include additional information about the client. As such, as the service center receives the HTTP request, at block 415, the header is checked to obtain any client information. At this point in the process, the client is identified, in order to make the proper association between the client, the service plan, source IP address and target IP address. For instance, client credentials may be accessed over a path in the network capable device, or cookie, or as header information, all as provided in the header of the HTTP request.

If the client credentials are discoverable, then the process proceeds to block 425. On the other hand, if the client credentials are not discoverable in the header, then the DNS server makes a request to the client for information. For instance, a form is displayed in which a client can submit credentials. As shown in FIG. 4A, at block 421, the client through the network capable device responds with client information. As such, the client is identified.

At block 425, the client credentials are checked against a database of clients, or DNS subscribers that have service plans. If the credentials are not valid, the process returns back to the block 420 to request additional client information for login purposes. On the other hand, if the credentials are valid, a "token" value is generated. For instance, the token is a random number. The token is sufficiently random in order to generate a unique domain name for a DNS request in block 430.

At 430, a domain name is generated for a login completion page (LCP). The login completion page includes the token value, as follows: token.k.DNSSERVICENAME.com. In the above domain name, the DNSSERVICENAME is managed by the service center (e.g., center 140 of FIG. 1A). The domain name for the LCP page includes the token, and a delimiter ("k") which separates the token from the name of the web site. The domain name is resolvable to an IP address for the web site "DNSSERVICENAME" managed by the service center.

At 435, the service center redirects the network capable device to the domain name listed above (token.k.DNSSERVICENAME.com). In this manner, because the token is sufficiently random and is included in the domain name, the network capable device has not seen it before (e.g., does not have it stored in cache memory), and must send the domain name to the DNS server for domain name resolution. In this manner, this process guarantees that the subsequent DNS request is sent from the network capable device through a corresponding network device that provides the source IP address.

At 440, the redirect command is received and a DNS request is generated by the network capable device for the domain name listed above (token.k.DNSSERVICENAME.com). The DNS request is sent to the DNS server, or actually the virtual DNS server to which DNS requests are sent by the network capable device.

At 445, the DNS request is received by the virtual DNS server, and processed by the DNS server supporting the virtual DNS server. The DNS server notes the "k" delimiter, and records the following values from the header of the DNS request: token, the source IP address, and the target IP address. The source IP address corresponds to the IP address of the network device used by the network capable device for accessing the internet and making DNS requests. Because, it is associated with a newly generated DNS request, the source IP address is guaranteed to be constant for the life of the session. That is, all DNS requests will come out of the network device for the life of the session. As such, even though the network capable device may use other network devices for accessing content on the internet, all DNS requests will be associated with the same network device having a source IP address, for the life of the session.

The flow of information proceeds from block 445 in FIG. 4A to block 450 via connection point A. At 450, the DNS server then sends back the IP address of the login completion page, or LCP page, that is run by the service center. More particularly, the IP address is sent to the network capable device (e.g., to the browser), where an HTTP request is generated for access to the LCP page. The HTTP request for the LCP page is sent to the service center.

At 460, the HTTP request is received by the service center. The header of the HTTP request contains the domain name of the original request (token.k.DNSSERVICENAME.com). As such, the service center is able to access the token value. At this point, the service center has not made a full association between the client, and a source IP address, or target IP address for a particular session.

At 465, the service center sends out a query to the family of DNS servers supporting the implementation of service plans for DNS subscribers. In particular, the query includes the token.

At 470, the DNS server receives the query, and checks token usage. That is, the DNS server checks to see if the token was used in a DNS request. If the token was not used, then the DNS server returns an error. This process is performed at each of the DNS servers.

On the other hand, if the DNS server verifies that the token was used, then the DNS server replies with the source IP address and target IP address that was stored in association with the use of the token, at block 475. That is, the information is returned back to the service center.

At block 480, the service center receives the source IP address and target IP address that was used in a DNS request for resolving a domain name that includes the token. As a result, the service center now can make an association between the client, on the one hand, and the source IP address and the target IP address on the other hand. Specifically, the token was previously associated with the client at block 425, and more recently with the source and target IP addresses at block 480. As such, through the use of the token, the service center can make a further association between the source IP address, target IP address and the client for purposes of implementing a service plan. As a result, a unique session is created for the user, and more particularly, between the network device used by the network capable device associated with the client, and the virtual DNS server that provides domain name resolution for the network capable device. The session exists as long as the source IP and the target IP do not change for the network capable device associated with the client.

At block 485, the source IP address, target IP address, and client association is delivered to the family of DNS servers providing service to its DNS subscribers. That is, the parameters for the unique session are delivered to all the DNS servers for purposes of implementing a service plan for the client. In one embodiment, the service plan is also delivered to the DNS servers. In another embodiment, each of the DNS servers have a look-up table that includes a list of DNS subscribers (clients) and their corresponding service plans. As such, once a session is created for a client, the service plan is readily implemented by the DNS server.

At 490, the DNS server receives the information regarding the unique session. As such, the DNS server stores the source IP, target IP, and the association with the client for identifying the unique session. At 495, the DNS server is able to associate the session for the client, with the client's service plan. More particularly, the DNS server can associate the source IP address and the target IP address with a particular session, for a particular client. As such, once the session is identified for a particular client, the client's service plan can be implemented.

While the methods of embodiments illustrated in flow charts of FIGS. 2 and 3 and the flow diagram of FIGS. 4A and 4B show specific sequences and quantity of operations, the present invention is suitable to alternative embodiments. For example, not all the operations provided for in the methods presented above are required for the present invention. Furthermore, additional operations can be added to the operations presented in the present embodiments. Likewise the sequences of operations can be modified depending upon the application.

A method and system for establishing unique sessions for DNS subscribers and for implementing service plans under the unique sessions for the DNS subscribers is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A method for implementing service plans for multiple clients on a communication network, the method comprising:

receiving a DNS request from a network device;

using a gray list to trigger implementation of a service plan;

determining a source IP address associated with the DNS request, wherein the source IP address is shared by a first client of the network device and a second client of the network device; and determining whether the DNS request originated from the first client.

2. The method of claim 1, wherein using the gray list comprises determining whether a domain name of the DNS request is listed on the gray list, and responsive to determining that the domain name is on the gray list and that the DNS request originated from the first client, determining client preferences listed in the service plan for the first client.

3. The method of claim 2, wherein the client preferences of the first client include blocking of the requested domain name of the DNS request.

4. The method of claim 1, wherein the DNS request comprises a target Internet protocol (IP) address of a virtual DNS server, the target IP address of the virtual server comprising a first IP subaddress identifying a DNS server supporting the virtual server and a second IP subaddress identifying the virtual DNS server.

5. The method of claim 4, wherein the virtual DNS server is one of a plurality of virtual DNS servers supported by the DNS server, each virtual DNS server having a target IP address that provides a resolved IP address associated with a domain name included in the DNS request.

6. The method of claim 1, further comprising:
establishing a session between the network device and a virtual server, the session being uniquely identified by a combination of the source IP address and a target IP address; and
determining whether the DNS request originated from the first client based on the source IP address and the target IP address associated with the DNS request.

7. The method of claim 6, further comprising:
sending the combination of the source IP address and the target IP address in association with the first client and the service plan to the virtual DNS server associated with the first client for implementing the service plan.

8. The method of claim 6, wherein establishing a session between the network device and the virtual server comprises:
uniquely assigning the service plan to the first client based on a combination of the source IP address and the target IP address associated with the DNS request originated by the first client.

9. The method of claim 1, wherein determining whether the DNS request originated from the first client comprises:
receiving a hypertext transfer protocol (HTTP) request for access to a first web site facilitating identification of the first client; and
identifying the first client from header information in the HTTP request.

10. The method of claim 1, wherein determining whether the DNS request originated from the first client further comprises:
receiving an HTTP request for access to a first web site facilitating identification of the first client;
requesting identifying information from the first client; and
identifying the first client based at least in part on the identifying information received from the first client.

11. The method of claim 1, wherein determining whether the DNS request originated from the first client further comprises:
generating a token associated with the first client, the token including a domain name;
receiving a request for the domain name included in the token, the request comprising the source IP address, a target IP address and the token;
receiving an HTTP request for access to a web site associated with the domain name, wherein the HTTP request includes the domain name;
accessing the token from the domain name;
sending a broadcast request for information associated with the token; and
receiving the source IP address and the target IP address from a virtual DNS server for association with the first client.

12. The method of claim 1, wherein the communication network comprises the Internet.

13. A computer program product for implementing service plans for multiple clients on a communication network, the computer program product comprising a non-transitory computer-readable storage medium storing computer program code for:
receiving a DNS request from a network device;
using a gray list to trigger implementation of a service plan;
determining a source IP address associated with the DNS request, wherein the source IP address is shared by a first client of the network device and a second client of the network device; and
determining whether the DNS request originated from the first client.

14. The computer program product of claim 13, wherein using the gray list comprises determining whether a domain name of the DNS request is listed on the gray list, and responsive to determining that the domain name is on the gray list and that the DNS request originated from the first client, determining client preferences listed in a service plan for the first client.

15. The computer program product of claim 14, wherein the client preferences of the first client include blocking of the requested domain name of the DNS request.

16. The computer program product of claim 13, wherein the DNS request comprises a target Internet protocol (IP) address of a virtual DNS server, the target IP address of the virtual server comprising a first IP subaddress identifying a DNS server supporting the virtual server and a second IP subaddress identifying the virtual DNS server.

17. The computer program product of claim 16, wherein the virtual DNS server is one of a plurality of virtual DNS servers supported by the DNS server, each virtual DNS server having a target IP address that provides a resolved IP address associated with a domain name included in the DNS request.

18. The computer program product of claim 13, further comprising computer program code for:
establishing a session between the network device and a virtual server, the session being uniquely identified by a combination of the source IP address and a target IP address; and
determining whether the DNS request originated from a first client based on the source IP address and the target IP address associated with the DNS request.

19. The computer program product of claim 18, further comprising computer program code for:
sending the combination of the source IP address and the target IP address in association with the first client and the service plan to the virtual DNS server associated with the first client for implementing the service plan.

20. The computer program product of claim 18, wherein the computer program code for establishing a session between the network device and the virtual server comprises computer program code for:
uniquely assigning the service plan to the first client based on a combination of the source IP address and the target IP address associated with the DNS request originated by the first client.

* * * * *